(12) United States Patent
Nagasawa

(10) Patent No.: US 11,981,283 B2
(45) Date of Patent: May 14, 2024

(54) REAR-SEAT AIRBAG

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/098,197

(22) Filed: Jan. 18, 2023

(65) Prior Publication Data

US 2023/0256929 A1    Aug. 17, 2023

(30) Foreign Application Priority Data

Feb. 17, 2022    (JP) ................................. 2022-023301

(51) Int. Cl.
| | |
|---|---|
| *B60R 21/21* | (2011.01) |
| *B60R 21/233* | (2006.01) |
| *B60R 21/239* | (2006.01) |
| *B60R 21/231* | (2011.01) |
| *B60R 21/26* | (2011.01) |

(52) U.S. Cl.
CPC ............ *B60R 21/21* (2013.01); *B60R 21/233* (2013.01); *B60R 21/239* (2013.01); *B60R 2021/23153* (2013.01); *B60R 2021/23308* (2013.01); *B60R 21/26* (2013.01)

(58) Field of Classification Search
CPC ........ B60R 2021/23153; B60R 21/233; B60R 21/231; B60R 21/21
See application file for complete search history.

(56) References Cited

U.S. PATENT DOCUMENTS

| | | | | |
|---|---|---|---|---|
| 3,642,303 A | * | 2/1972 | Irish ...................... | B60R 21/233 280/730.1 |
| 5,575,497 A | * | 11/1996 | Suyama ................ | B60R 21/231 280/730.2 |
| 5,647,609 A | * | 7/1997 | Spencer ................ | B60R 21/233 280/730.2 |
| 6,971,664 B2 | * | 12/2005 | Amamori .............. | B60R 21/233 280/743.1 |
| 7,040,653 B1 | * | 5/2006 | Breed ..................... | G06F 30/15 280/731 |
| 9,139,153 B2 | * | 9/2015 | Deng ..................... | B60R 21/21 |
| 9,308,883 B1 | * | 4/2016 | Schneider ............. | B60R 21/231 |
| 11,230,253 B2 | * | 1/2022 | Hellot ................... | B60R 21/239 |
| 11,279,314 B2 | * | 3/2022 | Adler ................ | B60R 21/23138 |

(Continued)

FOREIGN PATENT DOCUMENTS

| | | | | | |
|---|---|---|---|---|---|
| CN | 104943649 A | * | 9/2015 | ........... | B60R 21/205 |
| CN | 112744178 A | * | 5/2021 | ............. | B60N 2/002 |

(Continued)

*Primary Examiner* — Nicole T Verley
(74) *Attorney, Agent, or Firm* — MCGINN I.P. LAW GROUP, PLLC

(57) ABSTRACT

A rear-seat airbag configured to expand and deploy inward of a vehicle from a door trim beside a rear seat includes a first expansion air chamber and a second expansion air chamber. The first expansion air chamber is configured to expand and deploy to a space facing leg parts of a passenger in the rear seat that are above knees of the passenger. The second expansion air chamber is configured to expand and deploy to a space between the first expansion air chamber and the passenger in the rear seat.

6 Claims, 6 Drawing Sheets

(56) References Cited

U.S. PATENT DOCUMENTS

| | | | |
|---|---|---|---|
| 11,299,122 B2* | 4/2022 | Choi | B60R 21/2338 |
| 11,458,925 B2* | 10/2022 | Heudis | B60R 21/233 |
| 11,491,945 B2* | 11/2022 | Abramczyk | B60R 21/21 |
| 11,577,682 B1* | 2/2023 | Bates | B60R 21/214 |
| 2006/0028004 A1* | 2/2006 | Oota | B60R 21/231 |
| | | | 280/733 |
| 2006/0119085 A1* | 6/2006 | Masuda | B60R 21/18 |
| | | | 280/733 |
| 2010/0052297 A1* | 3/2010 | Fukawatase | B60R 21/239 |
| | | | 280/732 |
| 2013/0099470 A1* | 4/2013 | Wipasuramonton | B60R 21/26 |
| | | | 280/742 |
| 2015/0069741 A1* | 3/2015 | Shimazu | B60R 21/233 |
| | | | 280/729 |
| 2015/0258959 A1* | 9/2015 | Belwafa | B60R 21/233 |
| | | | 280/729 |
| 2017/0210329 A1* | 7/2017 | Rao | B60N 2/75 |
| 2017/0291566 A1* | 10/2017 | Karlow | B60R 21/231 |
| 2017/0361800 A1* | 12/2017 | Ohachi | B60R 21/231 |
| 2020/0122678 A1* | 4/2020 | Tanaka | B60R 21/0132 |
| 2020/0406852 A1* | 12/2020 | Fischer | B60R 21/2338 |
| 2021/0024028 A1* | 1/2021 | Kanegae | B60R 21/2338 |
| 2021/0094496 A1* | 4/2021 | Tanaka | B60R 21/20 |
| 2021/0129785 A1* | 5/2021 | Fischer | B60R 21/2338 |
| 2021/0245699 A1* | 8/2021 | Adler | B60R 21/21 |
| 2022/0355755 A1* | 11/2022 | Fischer | B60R 21/233 |

FOREIGN PATENT DOCUMENTS

| | | | | |
|---|---|---|---|---|
| DE | 4137719 | A1 * | 9/1992 | |
| DE | 9405143 | U1 * | 5/1994 | |
| DE | 10201836 | A1 | 8/2003 | B60R 21/207 |
| DE | 102010056184 | A1 * | 6/2012 | B60R 21/213 |
| DE | 102014217808 | A1 * | 3/2015 | B60R 21/18 |
| DE | 102014012671 | A1 * | 4/2015 | B60R 21/231 |
| DE | 102019118841 | A1 * | 1/2021 | B60N 2/06 |
| EP | 1625980 | A2 * | 2/2006 | B60R 21/18 |
| EP | 1634778 | A1 * | 3/2006 | B60N 2/42709 |
| EP | 4159550 | A1 * | 4/2023 | B60R 21/18 |
| FR | 3102961 | A1 * | 5/2021 | B60N 2/753 |
| JP | H07329688 | A * | 12/1995 | |
| JP | 2005-096653 | A | 4/2005 | |
| JP | 2006044614 | A * | 2/2006 | B60R 21/18 |
| JP | 2017222331 | A * | 12/2017 | B60R 21/207 |
| WO | WO-2008047652 | A1 * | 4/2008 | B60R 21/231 |
| WO | WO-2023012187 | A1 * | 2/2023 | |

* cited by examiner

REAR-SEAT AIRBAG

CROSS-REFERENCE TO RELATED APPLICATIONS

The present application claims priority from Japanese Patent Application No. 2022-023301 filed on Feb. 17, 2022, the entire contents of which are hereby incorporated by reference.

BACKGROUND

The disclosure relates to a rear-seat airbag and a rear-seat airbag apparatus.

In general practice, in a vehicle such as an automobile, a collision detector such as an acceleration sensor is disposed at a vehicle body front and detects a collision from ahead of the vehicle. When this collision detector detects a collision from ahead of the vehicle, an airbag apparatus is operated to protect occupants inside a vehicle cabin.

A vehicle with front seats and rear seats is known for including a front-seat airbag apparatus configured to protect occupants sitting in the front seats such as a driver's seat and a front passenger's seat, and a rear-seat airbag apparatus configured to protect passengers sitting in the rear seats disposed at a rear side of the front seats in a vehicle body.

As a rear-seat airbag apparatus of this kind, a rear-seat airbag configured to expand and deploy from a lower portion of a front seat toward a rear side of a backrest of the front seat is disclosed. The rear-seat airbag includes: a front expanding portion configured to expand and deploy upward along a rear surface of the backrest; a rear expanding portion configured to expand and deploy rearward from a distal end of the front expanding portion; and a restraint configured to restrain the rear expanding portion to the front expanding portion in such a manner that the rear expanding portion covers upper portions of the thighs of a rear-seat passenger (see, for example, Japanese Unexamined Patent Application Publication (JP-A) No. 2005-96653).

Research has been also made on an airbag system configured to deploy from a lap belt that constitutes a seatbelt.

SUMMARY

An aspect of the disclosure provides a rear-seat airbag. The rear-seat airbag is configured to expand and deploy inward of a vehicle from a door trim beside a rear seat. The rear-seat airbag includes a first expansion air chamber and a second expansion air chamber. The first expansion air chamber is configured to expand and deploy to a space facing leg parts of a passenger in the rear seat that are above knees of the passenger. The second expansion air chamber is configured to expand and deploy to a space between the first expansion air chamber and the passenger in the rear seat.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
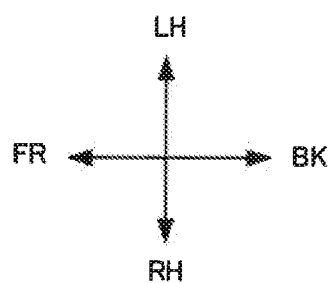
FIG. 1 is a top view of a rear-seat airbag according to an embodiment of the disclosure, illustrating a deployment form thereof.
Figure 1:
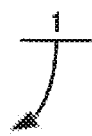
Figure 1:
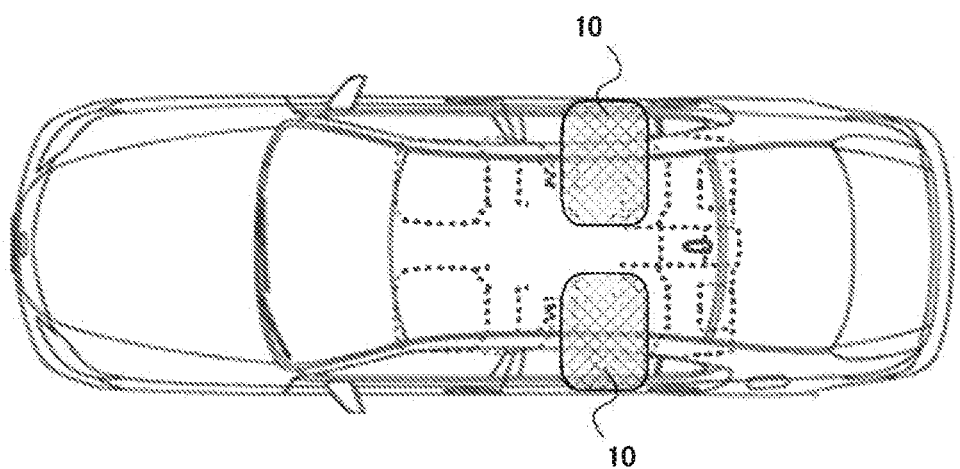

As disclosed in JP-A No. 2005-96653, a rear-seat airbag expands and deploys from a lower portion of a front seat of a vehicle toward a rear side of a backrest of the front seat. When a passenger in the rear seat of the vehicle is of small build, for example, a gap may be formed between the airbag and the passenger in the vehicle so that the passenger of small build in the vehicle is not to be restrained unerringly. In this respect, there is still room for improvement.

Such a rear-seat airbag as disclosed in JP-A No. 2005-96653 expands and deploys from the lower portion of the front seat of the vehicle toward the rear side of the backrest of the front seat. This configuration may cause a difference in force of restraining the passenger in the rear seat of the vehicle, depending upon a seat position and an angle of the backrest of the front seat of the vehicle.

In an airbag system configured to deploy from a lap belt, a seatbelt has such a property of being in a friction environment constantly that humidity, for example, may affect the seatbelt and hinder stable operation of an airbag.

It is desirable to provide a rear-seat airbag and a rear-seat airbag apparatus configured to stably restrain a passenger in a rear seat of a vehicle upon occurrence of a collision of the vehicle irrespective of a build of the passenger in the rear seat, and a seat position and an angle of a backrest of a front seat of the vehicle.

Embodiment

Referring to FIG. 1 to FIG. 6E, a rear-seat airbag apparatus 1 according to an embodiment of the disclosure will be described. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In FIG. 1 to FIG. 3, and FIG. 6A to FIG. 6E, arrow FR indicates a front side of a vehicle, arrow BK indicates a rear side of the vehicle, arrow UP indicates an upper side of the vehicle, arrow LH indicates a left side of the vehicle (one side of a vehicle width direction) as viewed from the vehicle upper side, and arrow RH indicates a right side of the vehicle (the other side of the vehicle width direction).

In the following description, a vertical direction, a fore-and-aft direction, and a lateral direction are used to respectively indicate a vehicle vertical direction, a vehicle fore-and-aft direction, and a vehicle lateral direction unless specified otherwise.

Rear-Seat Airbag Apparatus 1

As illustrated in FIG. 1, the rear-seat airbag apparatus 1 according to the embodiment is disposed in a door trim beside each of the rear seats in the vehicle, and a rear-seat airbag 10 expands and deploys inward of the vehicle from the door trim beside of the rear seat.

The door trim includes a fragile portion, which is to be an opening when the rear-seat airbag 10 expands and deploys.

It is noted that in the embodiment, the rear-seat airbag apparatus 1 configured to restrain a passenger sitting in the rear seat on the left side of the vehicle will be given as an example below.

Figure 2:
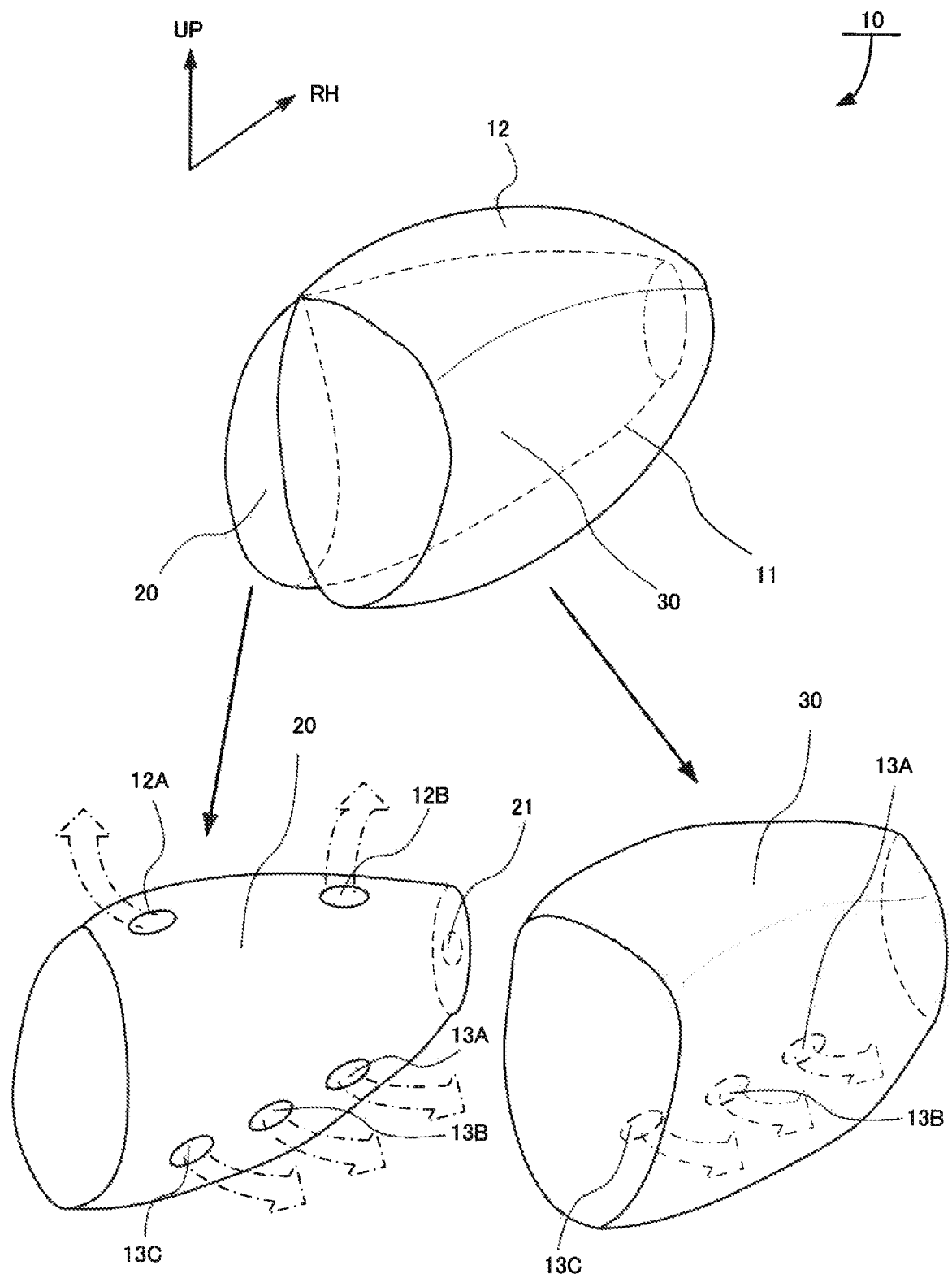
FIG. 2 is a perspective view of the rear-seat airbag according to the embodiment of the disclosure, illustrating a configuration thereof.

As illustrated in FIG. 2, the rear-seat airbag 10 in the rear-seat airbag apparatus 1 according to the embodiment includes a first expansion air chamber 20 and a second expansion air chamber 30.

The first expansion air chamber 20 is an airbag configured to expand and deploy to a space facing leg parts of a passenger CR in the rear seat that are above the knees KN.

A deployment shape of the first expansion air chamber 20 is a substantially triangular prism as illustrated in FIG. 2, and the first expansion air chamber 20 serves as a reaction force bag.

The second expansion air chamber 30 is an airbag configured to expand and deploy to a space between the first expansion air chamber 20 and the passenger CR in the rear seat.

A deployment shape of the second expansion air chamber 30 is a triangular prism having a triangular cross section as illustrated in FIG. 2, and the second expansion air chamber 30 serves as a passenger restraint bag.

As illustrated in FIG. 2, the first expansion air chamber 20 and the second expansion air chamber 30 are coupled to each other by a tether sewn in a lower joint 11.

In one example, when the first expansion air chamber 20 and the second expansion air chamber 30 expand and deploy, the joint 11 extends from the vicinity of the abdomen of the passenger CR in the rear seat toward a backrest of a front seat.

The joint 11 has first vent holes 13A, 13B, and 13C via which high-pressure gas supplied to the first expansion air chamber 20 from an inflator, not illustrated, is discharged to the second expansion air chamber 30.

It is noted that diameters of exhaust openings of the first vent holes 13A, 13B, and 13C are determined in accordance with a volume of the first expansion air chamber 20 and the second expansion air chamber 30 and a supply amount of the high-pressure gas supplied from the inflator.

Meanwhile, an upper portion 12 of the first expansion air chamber 20 is not coupled to an upper portion of the second expansion air chamber 30, and the upper portion 12 of the first expansion air chamber 20 has second vent holes 12A and 12B for contraction.

It is noted that diameters of exhaust openings of the second vent holes 12A and 12B are determined in accordance with a volume of the first expansion air chamber 20, a magnitude of pressure applied by the passenger CR, and an intended deformation state of the first expansion air chamber 20 as time elapses.

Figure 3:
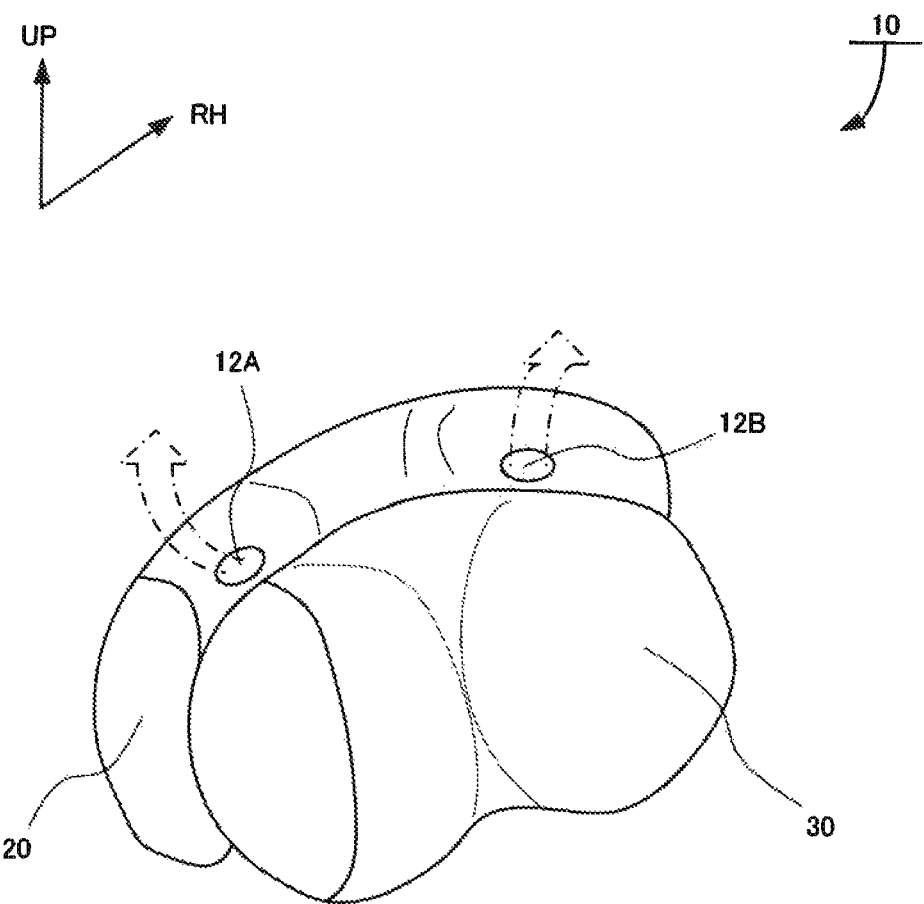
FIG. 3 is a perspective view of the rear-seat airbag according to the embodiment of the disclosure, illustrating a deployment form of the rear-seat airbag when expanded and deployed.

When the first expansion air chamber 20 and the second expansion air chamber 30 normally expand, the exhaust openings of the second vent holes 12A and 12B are closed by the second expansion air chamber 30. In response to the pressure being applied by the passenger CR so as to increase an internal pressure of the second expansion air chamber 30 as illustrated in FIG. 3, the exhaust openings are opened to let out part of the high-pressure gas in the first expansion air chamber 20.

The first expansion air chamber 20 includes a coupler 21 to the inflator, not illustrated.

That is, when the inflator is started, the high-pressure gas from the inflator is supplied into the first expansion air chamber 20 so that the first expansion air chamber 20 expands and deploys.

Accordingly, part of the high-pressure gas supplied from the inflator is supplied into the second expansion air chamber 30 via the first vent holes 13A, 13B, and 13C so that the second expansion air chamber 30 also expands and deploys.

The inflator along with the rear-seat airbag 10 is held in a case, disposed in the door trim beside the rear seat, and supplies the high-pressure gas to the first expansion air chamber 20.

In one example, the inflator is coupled to the first expansion air chamber 20 configured to communicate with the second expansion air chamber 30 via the first vent holes 13A, 13B, and 13C.

Electrical Configuration of Rear-Seat Airbag Apparatus 1

Figure 4:
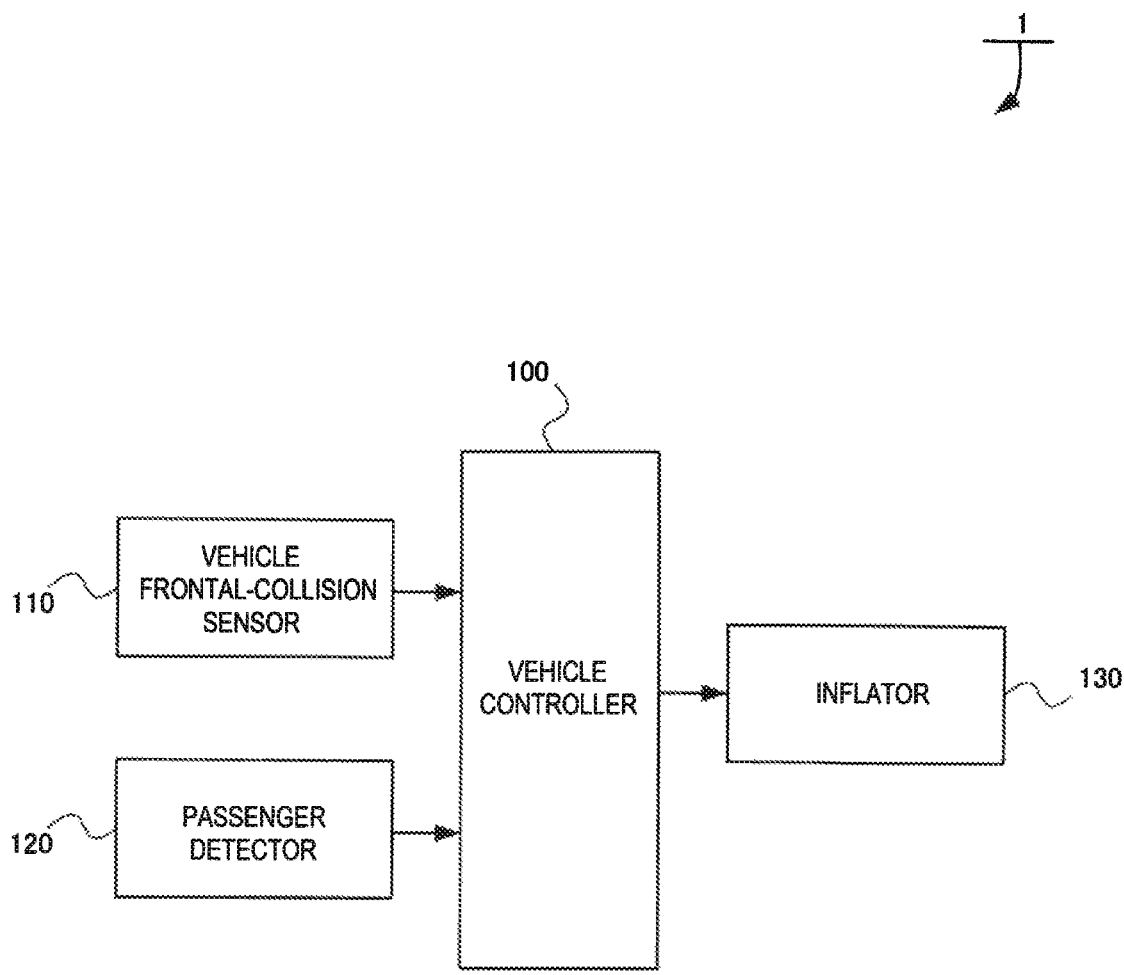
FIG. 4 is a block diagram illustrating an electrical configuration of a rear-seat airbag apparatus according to the embodiment of the disclosure.

Referring to FIG. 4, an electrical configuration of the rear-seat airbag apparatus 1 according to the embodiment will be described.

As illustrated in FIG. 4, the rear-seat airbag apparatus 1 includes a vehicle controller 100, a vehicle frontal-collision sensor 110, a passenger detector 120, and an inflator 130.

The vehicle controller 100 includes components such as a central processing unit (CPU), a read only memory (ROM), and a random access memory (RAM). The vehicle controller 100 is an electronic control unit (ECU) configured to perform, for example, various kinds of arithmetic processing for vehicle control.

It is noted that in the embodiment, when the passenger CR is determined to be sitting in the rear seat based on detection information from the passenger detector 120, the vehicle controller 100 controls operation of the inflator 130 based on a sensing signal from the vehicle frontal-collision sensor 110, described later.

When a collision from ahead of the vehicle occurs, the vehicle frontal-collision sensor 110 outputs to the vehicle controller 100 a sensing signal to the effect that the collision has been detected.

In one example, the vehicle frontal-collision sensor 110 may be an acceleration sensor configured to detect an impact or vibration applied to the vehicle as an acceleration.

The acceleration sensor may be a piezo-resistive acceleration sensor utilizing a change in electrical resistance of semiconductor or an electrostatic capacity acceleration sensor configured to detect a gap change between a movable part and a stationary part of a comb electrode as an electrostatic capacity.

Alternatively, the acceleration sensor configured to detect a collision and another acceleration sensor configured to detect an acceleration of a floor may be provided to determine the collision based on acceleration values from both of the acceleration sensors.

The passenger detector 120 detects the passenger CR sitting in the rear seat on each side.

The passenger detector 120 may be a load sensor disposed inside a seat surface of the rear seat on each side or a detection method such as a method of analyzing a captured image of an inside of a vehicle cabin.

The inflator 130 is disposed in the door trim beside the rear seat, and includes the rear-seat airbag 10 folded, an ignition device, an ignition agent, a gas generation agent, and a container box configured to contain these components.

In the inflator 130, when the ignition device is started in response to a control signal from the vehicle controller 100, the ignition agent catches fire to generate a large amount of gas, which is supplied via the first expansion air chamber 20 and the first vent holes 13A, 13B, and 13C that constitute the rear-seat airbag 10 so as to expand and deploy the second expansion air chamber 30.

Control of Rear-Seat Airbag Apparatus 1

Figure 5:
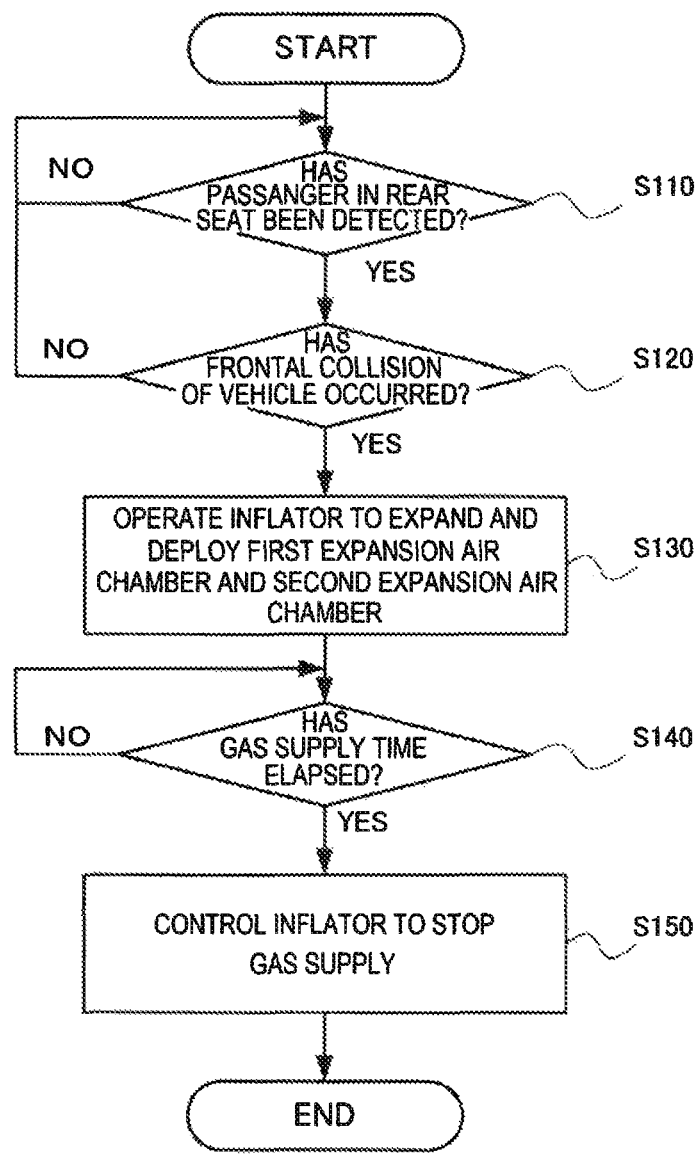
FIG. 5 is a flowchart of a process flow by a vehicle controller of the rear-seat airbag apparatus according to the embodiment of the disclosure.

As illustrated in FIG. 5, the vehicle controller 100 determines whether the passenger CR in the rear seat has been detected (step S110). In one example, the vehicle controller 100 determines whether the vehicle controller 100 has received, from the passenger detector 120, a signal to the effect that the passenger CR in the rear seat has been detected.

When the vehicle controller 100 detects the passenger CR in the rear seat ("YES" at step S110), the vehicle controller 100 makes the process proceed to step S120.

Unless the vehicle controller 100 detects the passenger CR in the rear seat ("NO" at step S110), the vehicle controller 100 resets the process and stands by.

Next, the vehicle controller 100 determines whether a collision has occurred at the vehicle front (step S120).

At this time, when the vehicle controller 100 determines that no collision has occurred at the vehicle front, that is, when the vehicle controller 100 determines that the vehicle controller 100 has received no sensing signal from the vehicle frontal-collision sensor 110 ("NO" at step S120), the vehicle controller 100 returns the process to step S110.

When the vehicle controller 100 determines that a collision has occurred at the vehicle front ("YES" at step S120), for example, when the vehicle controller 100 determines that the vehicle controller 100 has received, from the vehicle frontal-collision sensor 110, the sensing signal to the effect that a collision has occurred at the vehicle front, the vehicle controller 100 performs control to operate the inflator 130 so as to expand and deploy the first expansion air chamber 20 and the second expansion air chamber 30 (step S130).

Next, the vehicle controller 100 determines whether predetermined time of gas supply by the inflator 130 has elapsed (step S140).

When the vehicle controller 100 determines that the predetermined time of gas supply by the inflator 130 has not elapsed ("NO" at step S140), the vehicle controller 100 resets the process and stands by.

At this step, the predetermined time refers to, for example, a period of time for supplying a sufficient amount of gas to expand and deploy the first expansion air chamber 20 and the second expansion air chamber 30.

When the vehicle controller 100 determines that the predetermined time of gas supply by the inflator 130 has elapsed ("YES" at step S140), the vehicle controller 100 controls the inflator 130 to stop gas supply by the inflator 130 (step S150), and ends the process.

Referring now to FIG. 6A to FIG. 6E, a description will be made on how the first expansion air chamber 20 and the second expansion air chamber 30 deploy over time.

Figure 6A:
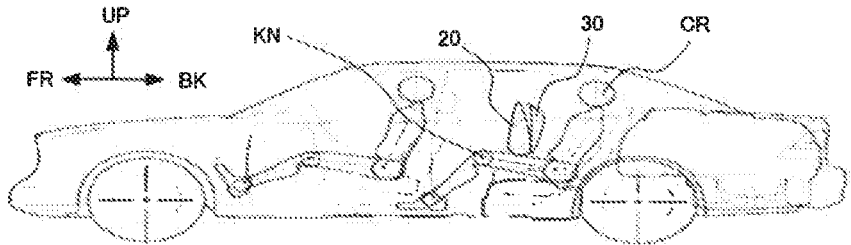
FIG. 6A to FIG. 6E are diagrams illustrating transitions of the deployment form of the rear-seat airbag according to the embodiment of the disclosure.
Figure 6B:
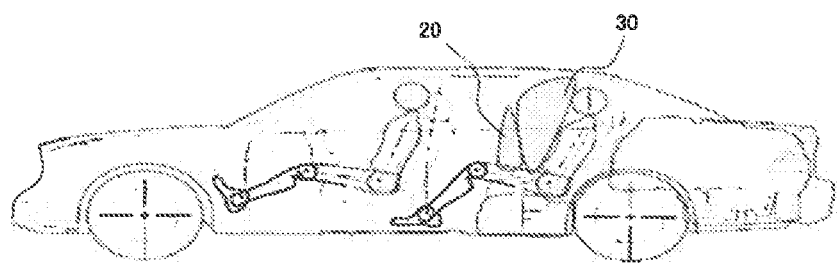
Figure 6C:
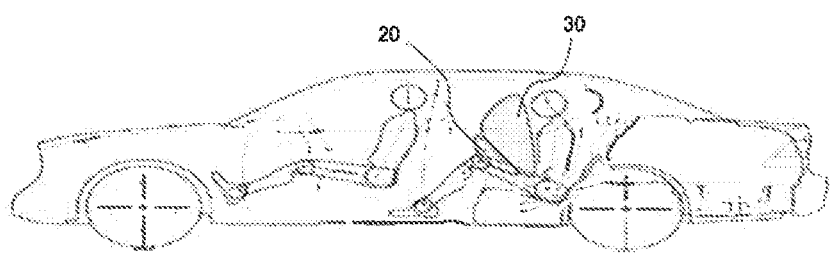

As illustrated in FIG. 6A, upon occurrence of a collision at the vehicle front, when the inflator 130 is operated in response to an operation signal from the vehicle controller 100, high-pressure gas from the inflator 130 flows into the first expansion air chamber 20, and the first expansion air chamber 20 expands and deploys to slide into the space that faces the leg parts above the knees KN of the passenger CR in the rear seat.

At this time, the high-pressure gas that has flowed into the first expansion air chamber 20 partly flows into the second expansion air chamber 30 via the first vent holes 13A, 133, and 13C so as to start expansion and deployment of the second expansion air chamber 30 as well. As illustrated in FIG. 63, after the predetermined time has elapsed, expansion and deployment of the first expansion air chamber 20 and the second expansion air chamber 30 is completed so that reaction force is generated in the first expansion air chamber 20.

Next, the frontal collision of the vehicle causes the upper body of the passenger CR in the rear seat to fall forward of the vehicle so that the jaw, for example, of the passenger CR comes into contact with the closest second expansion air chamber 30, applies pressure to and deforms the second expansion air chamber 30, and increases the internal pressure of the second expansion air chamber 30. As illustrated in FIG. 3, this affects and opens the exhaust openings of the second vent holes 12A and 123 of the first expansion air chamber 20 that have been closed between the first expansion air chamber 20 and the second expansion air chamber 30, thereby letting out the high-pressure gas.

Figure 6D:
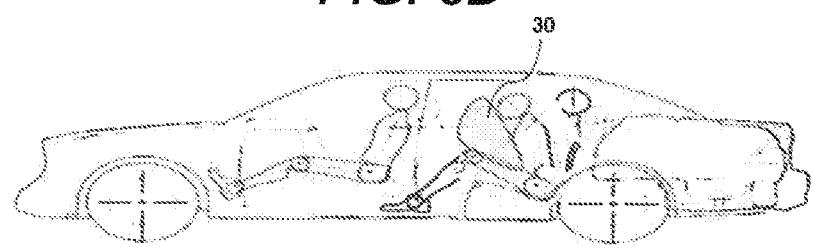

Then, as illustrated in FIG. GC and FIG. 6D, owing to forward inclination of the upper body of the passenger CR and discharge of the high-pressure gas from the first expansion air chamber 20 close to the knees KN, the first expansion air chamber 20 and the second expansion air chamber 30 are twisted between the door and the passenger CR and start to be inclined forward.

Figure 6E:
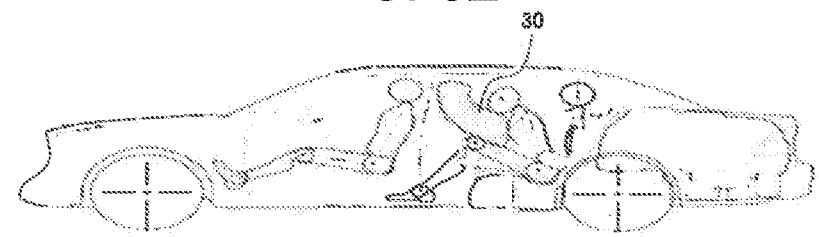

Then, as illustrated in FIG. 6E, when all of the high-pressure gas is discharged from the first expansion air chamber 20, the passenger CR continues to be inclined further forward so that the second expansion air chamber 30 moves forward of the vehicle and serves to reduce pressure on the chest and the abdomen, for example, of the passenger CR.

Operation and Effect

As described above, the rear-seat airbag 10 of the rear-seat airbag apparatus 1 according to the embodiment is configured to expand and deploy inward of the vehicle from the door trim beside the rear seat, and the rear-seat airbag 10 includes: the first expansion air chamber 20 configured to expand and deploy to the space that faces the leg parts above the knees KN of the passenger CR in the rear seat; and the second expansion air chamber 30 configured to expand and deploy to the space between the first expansion air chamber 20 and the passenger CR in the rear seat.

That is, since the first expansion air chamber 20 expands and deploys to the space that faces the leg parts above the knees KN of the passenger CR in the rear seat, the first expansion air chamber 20 serves as a reaction force bag. The second expansion air chamber 30 expands and deploys to the space between the first expansion air chamber 20 and the passenger CR in the rear seat so as to serve as a passenger restraint bag.

Consequently, the rear-seat airbag 10 of the rear-seat airbag apparatus 1 serves both as the reaction force bag and as the passenger restraint bag so that irrespective of a build of the passenger CR in the rear seat, the passenger CR in the rear seat can be stably restrained upon occurrence of the collision of the vehicle.

Moreover, because the rear-seat airbag 10 of the rear-seat airbag apparatus 1 expands and deploys inward of the vehicle from the door trim beside the rear seat, the passenger CR in the rear seat can be stably restrained upon occurrence of the collision of the vehicle irrespective of the seat position and the angle of the backrest of the front seat.

The deployment shapes of the first expansion air chamber 20 and the second expansion air chamber 30 of the rear-seat airbag apparatus 1 according to the embodiment are substantially triangular prisms.

That is, the first expansion air chamber 20 and the second expansion air chamber 30 have a substantially triangular cross section as viewed in the vehicle fore-and-aft direction.

Therefore, the first expansion air chamber 20 deploys in such a manner that a substantially flat surface of the first expansion air chamber 20 including one side of the substantially triangular cross section is substantially in parallel to the space that faces the leg parts above the knees KN of the passenger CR in the rear seat. Thus, the first expansion air chamber 20 can generate stable reaction force to the passenger CR.

Moreover, the second expansion air chamber 30 expands and deploys in such a manner that a substantially flat surface of the first expansion air chamber 20 including a side intersecting the one side substantially in parallel to the space that faces the leg parts above the knees KN of the passenger CR in the rear seat is opposed to a substantially flat surface of the second expansion air chamber 30. Thus, the reaction force generated by the first expansion air chamber 20 can be stably applied to the second expansion air chamber 30.

Furthermore, when the second expansion air chamber 30 expands and deploys in such a manner that the substantially flat surface of the first expansion air chamber 20 including the side intersecting the one side substantially in parallel to the space that faces the leg parts above the knees KN of the passenger CR in the rear seat is opposed to the substantially flat surface of the second expansion air chamber 30, the upper body of the passenger CR is restrained by the second expansion air chamber 30 of a convex shape. Consequently, when the deployment state of the second expansion air chamber 30 is deformed to make the convex shape bent inward at the center, the upper body of the passenger CR can be restrained while an impact on the upper body of the passenger CR is appropriately reduced.

The first expansion air chamber 20 deploys substantially in parallel to the space that faces the leg parts above the knees KN of the passenger CR in the rear seat. While maintaining the substantially flat surface of the first expansion air chamber 20 that includes one side of substantially the triangular cross section, the deployment state of the first expansion air chamber 20 is deformed and contracted. Thus, with the impact on the upper body of the passenger CR being further reduced, the upper body of the passenger CR can be restrained.

The inflator 130 is coupled to the first expansion air chamber 20 of the rear-seat airbag apparatus 1 according to the embodiment. The first expansion air chamber 20 and the second expansion air chamber 30 are coupled to each other with the lower joint 11. The joint 11 has the first vent holes 13A, 13B, and 13C.

That is, when the inflator 130 is started, the high-pressure gas generated is supplied into the first expansion air chamber 20, and part of the high-pressure gas supplied flows into the second expansion air chamber 30 via the first vent holes 13A, 13B, and 13C.

Consequently, upward expansion and deployment of the first expansion air chamber 20 is completed at a position separate from the passenger CR, and subsequently, expansion and deployment of the second expansion air chamber 30 is completed to obtain the reaction force from the first expansion air chamber 20.

That is, upon occurrence of the collision at the vehicle front, the first expansion air chamber 20 first expands and deploys to generate stable reaction force, and the second expansion air chamber 30 expands and deploys before the passenger CR in the rear seat receives the impact generated by the collision at the vehicle front and falls forward of the vehicle.

Therefore, after the first expansion air chamber 20 has generated the stable reaction force, the second expansion air chamber 30 expands and deploys to restrain the passenger CR in the rear seat that has received the impact generated by the collision at the vehicle front and fallen forward of the vehicle. Thus, upon occurrence of the collision of the vehicle, the passenger CR in the rear seat can be stably restrained without giving more resistance to the upper body of the passenger CR in the rear seat than intended.

The first expansion air chamber 20 of the rear-seat airbag apparatus 1 according to the embodiment has the second vent holes 12A and 12B for contraction.

Therefore, in response to the impact generated by the collision at the vehicle front, the upper body of the passenger CR in the rear seat falls forward of the vehicle and applies external pressure to the first expansion air chamber 20 and the second expansion air chamber 30 that are expanding and deploying. Then, internal pressures of the first expansion air chamber 20 and the second expansion air chamber 30 that are expanding and deploying are increased to let out the high-pressure gas from the exhaust openings of the second vent holes 12A and 123 of the first expansion air chamber 20 so that the deployment state of the first expansion air chamber 20 is deformed and contracted. Thus, while the impact on the upper body of the passenger CR is being reduced, the upper body of the passenger CR can be restrained.

The exhaust openings of the second vent holes 12A and 12B of the rear-seat airbag apparatus 1 according to the embodiment are opened in response to the pressure being applied by the passenger CR.

That is, until the pressure is applied by the passenger CR, the exhaust openings of the second vent holes 12A and 128 are in a closed state, and in response to the pressure being applied by the passenger CR, the internal pressure of the first expansion air chamber 20 is increased to open the exhaust openings.

Therefore, until the pressure is applied by the passenger CR, the first expansion air chamber 20 maintains the reaction force generated, and in response to the pressure being applied by the passenger CR, the reaction force is gradually released so that while the impact on the upper body of the passenger CR is being reduced, the upper body of the passenger CR can be restrained.

When the vehicle controller 100 of the rear-seat airbag apparatus 1 according to the embodiment receives, from the passenger detector 120, the signal to the effect that the passenger detector 120 has detected the passenger CR in the rear seat, and when the vehicle controller 100 determines that the collision has occurred at the vehicle front, the vehicle controller 100 performs control to operate the inflator 130 so as to expand and deploy the first expansion air chamber 20 and the second expansion air chamber 30.

That is, generally, the passenger CR sits in the rear seat of the vehicle less frequently than the passenger CR sits in the front passenger's seat of the vehicle.

For this reason, when the signal to the effect that the passenger CR in the rear seat has been detected is received from the passenger detector 120, and when it is determined that the collision has occurred at the vehicle front, control can be performed to operate the inflator 130 so as to expand and deploy the first expansion air chamber 20 and the second expansion air chamber 30.

First Modified Example

In the description of the embodiment, the rear-seat airbag 10 includes the first expansion air chamber 20 and the second expansion air chamber 30, for example. However, plural second expansion air chambers 30, such as an expansion air chamber configured to sustain the head of the passenger CR and an expansion air chamber configured to sustain the chest of the passenger CR, may be provided.

With such a configuration, the passenger CR in the rear seat can be protected safely by restraining the passenger CR in such a manner that the expansion air chambers respectively conform with behaviors by main parts of the body of the passenger CR.

It is noted that the rear-seat airbag apparatus 1 according to the embodiment of the disclosure can be implemented by recording the process by the vehicle controller 100 on a recording medium readable by a computer system, and by causing the vehicle controller 100 to read a program recorded on the recording medium and execute the program. The computer system in this description includes an OS and hardware such as peripheral devices.

The "computer system" also includes a homepage providing environment (or display environment) when the World Wide Web (WWW) system is used. The program may be transmitted from the computer system with the program stored in a storage, for example, to another computer system via a transmission medium or by a transmission wave in the transmission medium. In this description, the "transmission medium" configured to transmit the program refers to a medium serving to transmit information, for example, a network (communication network) such as the Internet or a communication line such as a telephone line.

The program may serve to implement some of the above-described functions. Furthermore, the program may be what is called a difference file (difference program), with which the program already recorded on the computer system can be combined to implement the functions.

Although the embodiment of the disclosure has been described in detail heretofore with reference to the drawings, configuration examples are not to be limited to the embodiment but may include designs, for example, within the scope of the subject matter of the disclosure.

The invention claimed is:

1. A rear-seat airbag configured to expand and deploy inward of a vehicle from a door trim beside a rear seat, the rear-seat airbag comprising:
 a first expansion air chamber configured to expand and deploy to a space facing leg parts of a passenger in the rear seat, the leg parts being above knees of the passenger; and
 a second expansion air chamber configured to expand and deploy to a space between the first expansion air chamber and the passenger in the rear seat,
 wherein a deployment shape of each of the first expansion air chamber and the second expansion air chamber is a triangular prism having a triangular cross section,
 wherein an inflator is coupled to the first expansion air chamber,
 wherein the first expansion air chamber and the second expansion air chamber are coupled to each other with a lower joint,
 wherein the lower joint has a first vent hole, and
 wherein the lower joint extends from a vicinity of a mid-section of the rear seat toward a backrest of a front seat.

2. The rear-seat airbag according to claim 1, wherein the first expansion air chamber has a second vent hole for contracting the first expansion air chamber.

3. The rear-seat airbag according to claim 2, wherein an exhaust opening of the second vent hole is configured to be open in response to a pressure being applied by the passenger.

4. The rear-seat airbag according to claim 1, wherein an upper portion of the first expansion air chamber is not coupled to an upper portion of the second expansion air chamber, and
 wherein the upper portion of the first expansion air chamber has a second vent hole for contraction.

5. The rear-seat airbag according to claim 4, wherein a diameter of the second vent hole is determined in accordance with a volume of the first expansion air chamber, a magnitude of pressure applied by the passenger, and an intended deformation state of the first expansion air chamber as time elapses.

6. The rear-seat airbag according to claim 1, wherein a diameter of the first vent hole is determined in accordance with a volume of the first expansion air chamber and the second expansion air chamber and a supply amount of a high-pressure gas supplied from the inflator.

* * * * *